US012792866B2

(12) United States Patent
Apcar et al.

(10) Patent No.: US 12,792,866 B2
(45) Date of Patent: Nov. 10, 2026

(54) OFFLINE VERIFICATION OF EQUIPMENT ROAMING AND TAMPERING

(71) Applicant: Cisco Technology, Inc., San Jose, CA (US)

(72) Inventors: Jeffrey Owen Apcar, Willoughby (AU); Gonzalo Salgueiro, Raleigh, NC (US); Andrew Malcolm Stanley, Bethlehem, PA (US); Maria Soledad Palmero Amador, Toledo (ES); Esther Roure Vila, Alpicat (ES)

(73) Assignee: CISCO TECHNOLOGY, INC., San Jose, CA (US)

( * ) Notice: Subject to any disclaimer, the term of this patent is extended or adjusted under 35 U.S.C. 154(b) by 913 days.

(21) Appl. No.: 17/850,281

(22) Filed: Jun. 27, 2022

(65) Prior Publication Data

US 2023/0419070 A1 Dec. 28, 2023

(51) Int. Cl.

| | |
|---|---|
| ***G06K 19/07*** | (2006.01) |
| ***G01S 5/02*** | (2010.01) |
| ***G06K 17/00*** | (2006.01) |
| ***G06Q 10/08*** | (2023.01) |
| ***H04W 4/029*** | (2018.01) |

(52) U.S. Cl.

CPC ........ *G06K 19/0723* (2013.01); *G01S 5/0242* (2013.01); *G06K 17/0022* (2013.01); *G06Q 10/08* (2013.01); *H04W 4/029* (2018.02)

(58) Field of Classification Search

CPC ............ G06K 19/0723; G06K 17/0022; G01S 5/0242; G06Q 10/08; H04W 4/029

See application file for complete search history.

(56) References Cited

U.S. PATENT DOCUMENTS 6,175,308 B1 1/2001 Tallman et al.
2013/0057392 A1* 3/2013 Bullock ........... G06K 19/07345 340/10.5

(Continued)

FOREIGN PATENT DOCUMENTS

WO 2015/144210 A1 10/2015

OTHER PUBLICATIONS

Shroff, "System Identity With Intent To Mitigate Critical Part Replacement," https://www.tdcommons.org/dpubs_series/2504, Sep. 19, 2019, 9 pages.

(Continued)

*Primary Examiner* — James J Yang

(74) *Attorney, Agent, or Firm* — Edell, Shapiro & Finnan, LLC

(57) ABSTRACT

Presented herein are techniques to geographically track and monitor an unpowered device. A method includes during a powered off state of the device, and upon detecting a predetermined event, enabling a radio frequency monitoring tag affixed to the device to collect, via radio frequency reception, information indicative of a geographical location of the radio frequency monitoring tag, storing the information indicative of the geographical location of the radio frequency monitoring tag in memory of the radio frequency monitoring tag, and upon powering up of the device, sending by the device, to a remote server, the information indicative of the detected geographical location of the radio frequency monitoring tag.

20 Claims, 9 Drawing Sheets

(56) References Cited

U.S. PATENT DOCUMENTS

| | | | | |
|---|---|---|---|---|
| 2014/0038577 | A1* | 2/2014 | Kushtagi | H04W 48/04 455/418 |
| 2016/0189507 | A1 | 6/2016 | Rayner | |
| 2017/0248436 | A1* | 8/2017 | Goldman-Shenhar | G08B 13/2462 |
| 2019/0289452 | A1* | 9/2019 | Beyer, Jr. | H04W 76/50 |
| 2019/0362304 | A1* | 11/2019 | Vivas Suarez | G06K 7/00 |
| 2021/0368296 | A1 | 11/2021 | Sharma et al. | |
| 2022/0018927 | A1 | 1/2022 | Wigard et al. | |

OTHER PUBLICATIONS

TrueTwins, "The Digital Passport for products," https://www.truetwins.com/, retrieved on Jun. 27, 2022, 7 pages.

Jover, "LTE security, protocol exploits and location tracking experimentation with low-cost software radio," retrieved from https://arxiv.org/abs/1607.05171, Jul. 18, 2016, 9 pages.

* cited by examiner

OFFLINE VERIFICATION OF EQUIPMENT ROAMING AND TAMPERING

TECHNICAL FIELD

The present disclosure relates to geo-tracking network equipment while the network equipment is in an unpowered state, e.g., while in transit.

BACKGROUND

Securing the supply chain is an important challenge not only for manufacturers, but also for the ultimate end user who may desire assurance that a given product, item or device that is received through the supply chain is authentic and has not been tampered with or roughly handled during transit. A label, often disposed on the outside packaging of a product, may be used to identify the product, and may further be used to help track the product through the supply chain. The use of a label provides an authenticity indication through its mere existence and appearance or, in some cases, by containing unique data, such as a serial number.

However, a label cannot provide assurance that the received product has not been compromised during transit, e.g., as a result of a divergent delivery path taken, or because of a longer than expected transit time. A label also cannot be relied upon to determine whether a given product has made passage through a given country (such as, e.g., a country that is on an embargo list). The challenge to track a given product is compounded by the fact that, typically, the product is in a powered off state while in transit.

DESCRIPTION OF EXAMPLE EMBODIMENTS

Overview

Presented herein are techniques to geographically track and monitor an unpowered device without using traditional GPS mechanisms. A method includes, during a powered off state of the device, and upon detecting a predetermined event, enabling a radio frequency monitoring tag affixed to the device to collect, via radio frequency reception, information indicative of a geographical location of the radio frequency monitoring tag, storing the information indicative of the geographical location of the radio frequency monitoring tag in memory of the radio frequency monitoring tag, and upon powering up of the device, sending, by the device, to a remote server, the information indicative of the geographical locations detected by the radio frequency monitoring tag.

In another embodiment, a device is provided. The device includes an interface configured to enable network communications, a memory, and one or more processors coupled to the interface and the memory, and configured to: during a powered off state of the device, and upon detecting a predetermined event, enable a radio frequency monitoring tag affixed to the device to collect, via radio frequency reception, information indicative of a geographical location of the radio frequency monitoring tag, store the information indicative of the geographical location of the radio frequency monitoring tag in memory of the radio frequency monitoring tag, and upon powering up of the device, send, by the device, to a remote server, the information indicative of the geographical locations detected by the radio frequency monitoring tag.

Example Embodiments

Figure 1:
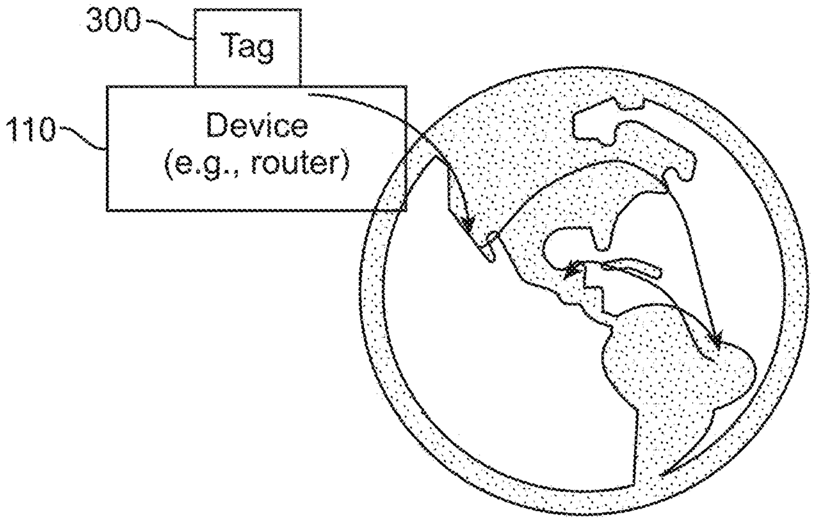
FIG. 1 shows a device, such as a device, and a tag associated with the device which is transported geographically along with the device, according to an example embodiment.

FIG. 1 shows a device 110, such as a networking device, router, etc., and a tag 300 associated, affixed, or integrated with the device 110, and which is transported geographically along with the device 110, according to an example embodiment. As shown, the combination of device 110 and tag 300 may be transported to any one or more authorized or unauthorized regions, countries or locations. Indeed, once a purchaser gains access to device 110, the purchaser might transport the device to any number of places, some of which might not be permissible under relevant export regulations.

Figure 2:
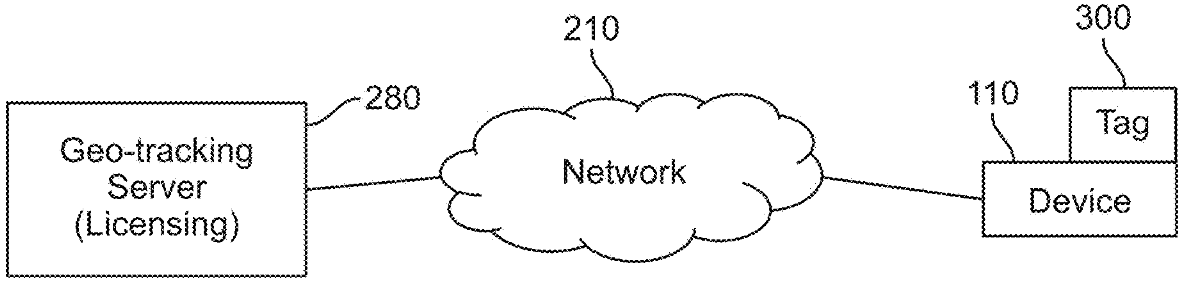
FIG. 2 is a block diagram showing the device and associated tag in communication with a geo-tracking server via a network, according to an example embodiment.

As shown in FIG. 2, and as will be explained in detail below, tag 300 and associated event/trigger logic 310 operate to geographically track device 110 as device 110 is transported in an unpowered state. When device 110 eventually transitions to a powered state, and connects to a network 210, the information collected by tag 300 is transferred, first to the device 110, and then by the device 110 to a geo-tracking server 280, which is configured to analyze the information collected by tag 300 and determine whether device 110 has been transported through any unauthorized regions, countries, or locations. In one embodiment, geo-tracking server 280 is part of a licensing server to which device 110 is configured to automatically connect upon powering up. In many cases, a network device, like device 110, must first access a licensing server to enable even rudimentary functionality on the network device. By "linking" the licensing server with geo-tracking server 280, the information collected by tag 300 is more likely to be received by geo-tracking server 280. Thus, in an embodiment, device 110 is configured to obtain relevant information recorded by tag 300, and forward that information (or at least aspects thereof) to geo-tracking server 280.

Figure 3:
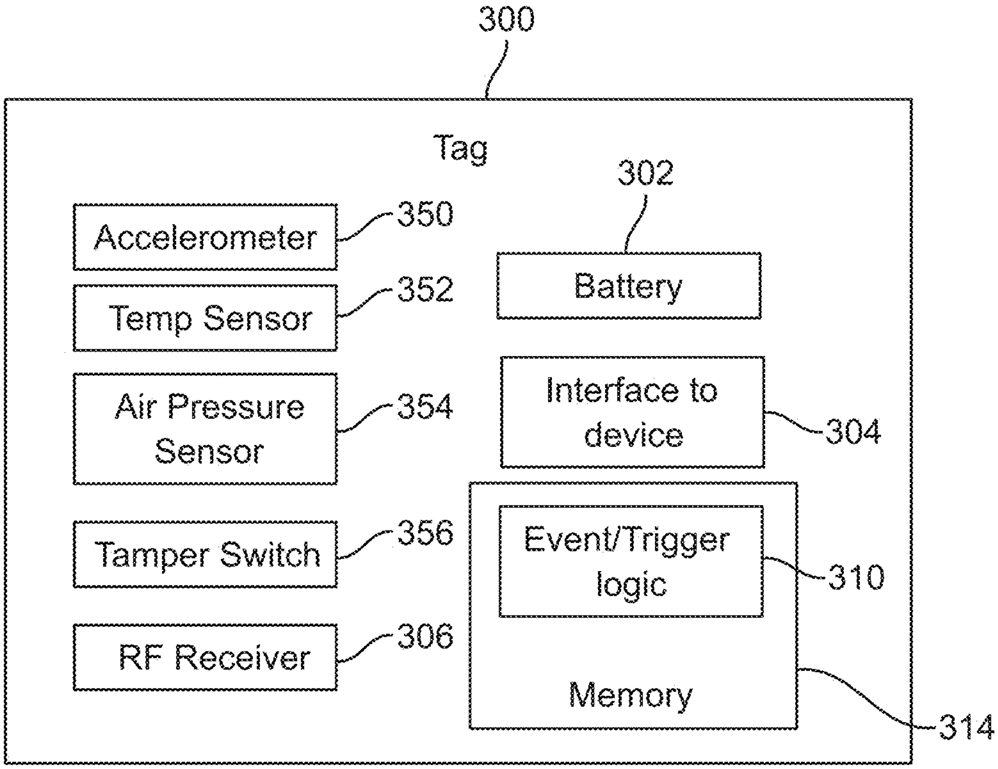
FIG. 3 shows a block diagram of the tag, including event/trigger logic, according to an example embodiment.

FIG. 3 shows a block diagram of tag 300, according to an example embodiment. Specifically, in one embodiment tag 300 comprises a battery powered RF receiver module configured to receive cellular long-term evolution (LTE) transmissions or broadcasts. Tag 300 may also be configured to receive other RF based protocols such as wireless local area network (LAN) (e.g., Wi-Fi) broadcasts and Automatic Dependent Surveillance-Broadcast (ADS-B) beacon broadcasts. Tag 300 may be associated, affixed, or integrated within a chassis of device 110, a line card of device 110 or any other hardware associated with device 110 that would benefit from transit surveillance. As shown in FIG. 3, tag 300 may comprise a battery 302, an interface to device 304 that may include a wired or wireless connection, event/trigger logic 310 stored within memory 314, an accelerometer 350, a temperature sensor 352, an air pressure sensor 354, tamper switch 356, and a radio frequency (RF) receiver 306.

In one embodiment, tag 300 takes advantage of System Information Blocks (SIBs), which are part of the Radio Resource Control Protocol (RCC) in cellular LTE communications. More specifically, in one implementation, event/trigger logic 310 may rely on System Information Block 1 (SIB1), which contains information to ascertain the general location of User Equipment (UE), and System Information Block 16 (SIB16), which contains time (UTC) information. In the case of the present embodiments, the UE is incorporated into tag 300 (e.g., RF receiver 306).

Figure 4:
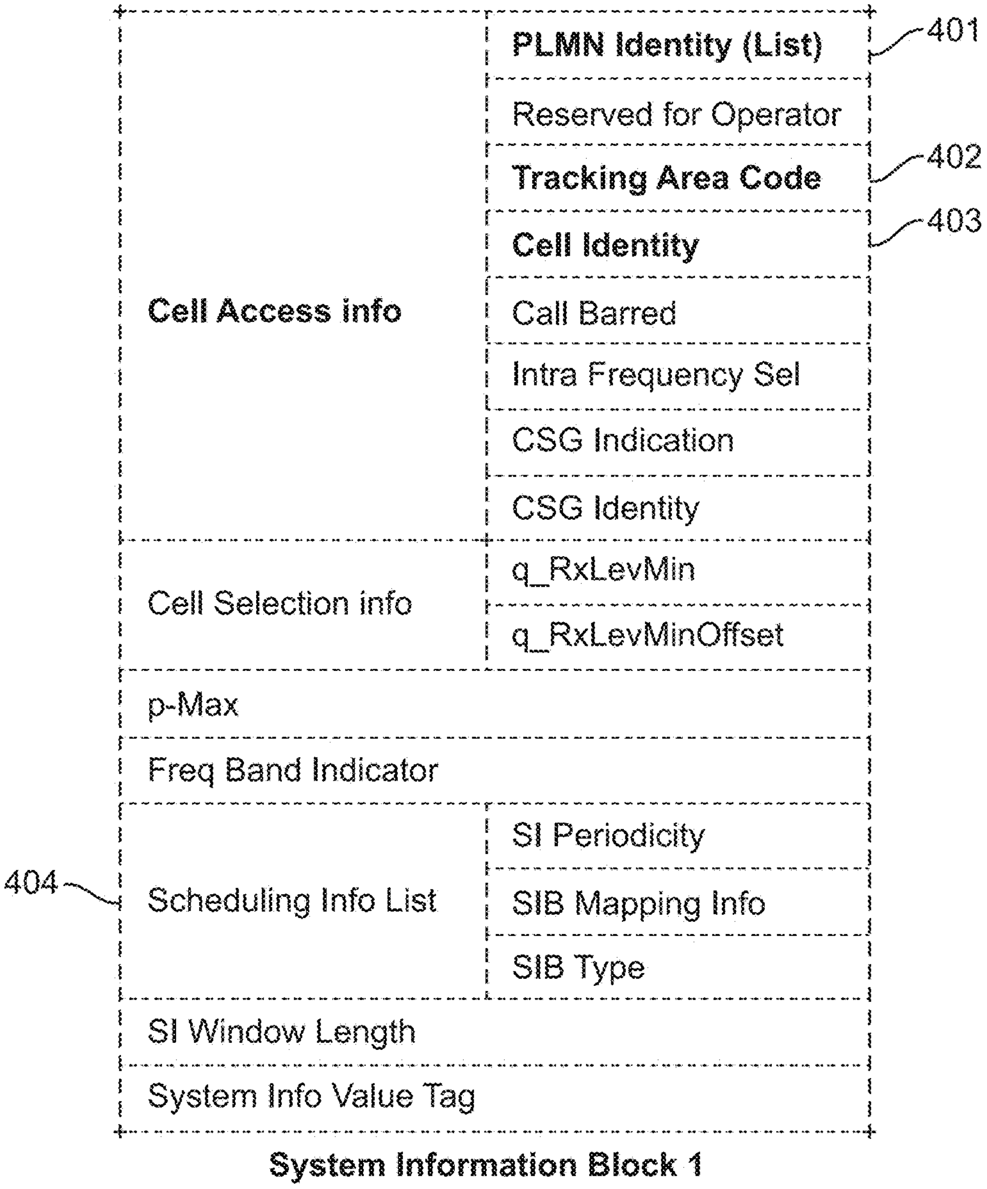
FIG. 4 shows a system information block 1 (SIB1) that is received over the air by the tag, according to an example embodiment.

System Information Blocks are transmitted on the broadcast channel in LTE networks, and all UEs are configured to receive them. A discussion of aspects of SIBI and SIB16 is provided next to provide relevant context. FIG. 4 shows SIBI that is received over the air by tag 300, according to an example embodiment. After initial synchronization to the network, a UE will listen for System Information Block Type 1 (SIB1) which carries the cell access related information. SIB1 has a transmission periodicity of 80 ms on the broadcast channel. Notably, SIB1 is not encrypted as it is used by the UE to gain access to the network; therefore no subscriber information module (SIM) is required to "sniff" its contents via a software defined radio (which may be part of RF receiver 306).

Figure 5:
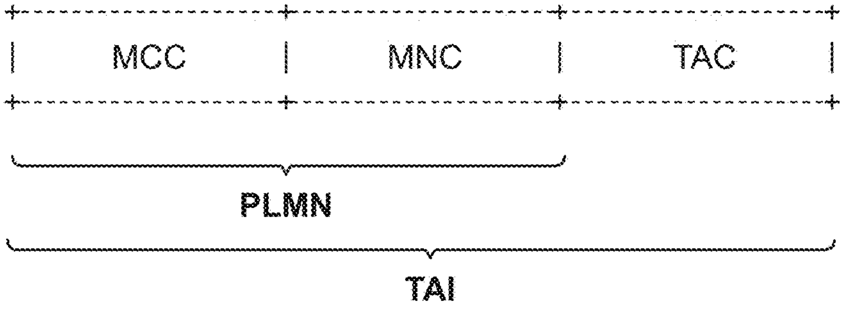
FIG. 5 is a tracking area identifier that is leveraged by the tag, according to an example embodiment.

SIB1 shown in FIG. 4 contains three information elements of interest for purposes of the instant embodiments: PLMN Identity 401, Tracking Area Code 402, and Cell Identity 403, which, together, can identify a broad location down to the cell granularity. More specifically, the Public Land Mobile Network (PLMN) Identity 401 is a five or six byte globally unique value that identifies the Mobile Country Code (MCC) and the Mobile Network Code (MNC). For example, the PLMN Identity 0x12f410 refers to MCC 214 (Spain) and MNC 01 (Vodafone). The tracking area code (TAC) 402 is an operator's unique identifier of a "neighborhood" of mobile cells and base stations. Combining the value of TAC 402 with the PLMN Identity 401 provides a globally unique value referred to as the Tracking Area Identifier (TAI), as shown in FIG. 5.

Figure 6:
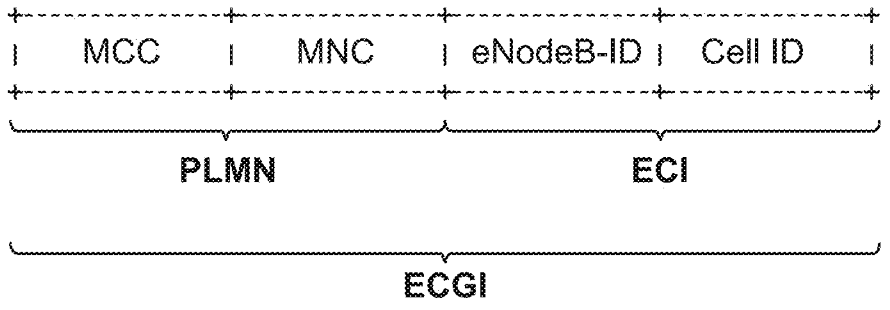
FIG. 6 is a cell global identifier that is leveraged by the tag, according to an example embodiment.

The Cell Identity 403, also referred to as E-UTRAN Cell Identifier (ECI), contains a combination of locally unique values for the mobile cell and base station tower (eNodeB) within the PLMN. Combining the Cell Identity 403 with the PLMN Identity 401 results in a global value representing the mobile cell referred to as the E-UTRAN Cell Global Identifier (ECGI), as shown in FIG. 6. Other fields of SIB1 shown in FIG. 4 (other than the one other exception noted below) are not relevant to the instant discussion and are not described further herein.

Those skilled in the art will appreciate that by receiving and filtering for the fields of interest in SIB1, it is possible, in accordance with an embodiment, to pinpoint the country, operator, base station and even cell where tag 300 (and thus device 110) is located. This level of geographical information (as opposed to highly accurate GPS location data) is more than sufficient to identify coarse geographical anomalies in the transport of device 110 from, e.g., a given vendor to an intended customer destination, or from any given point A to any given point B.

Figure 7:
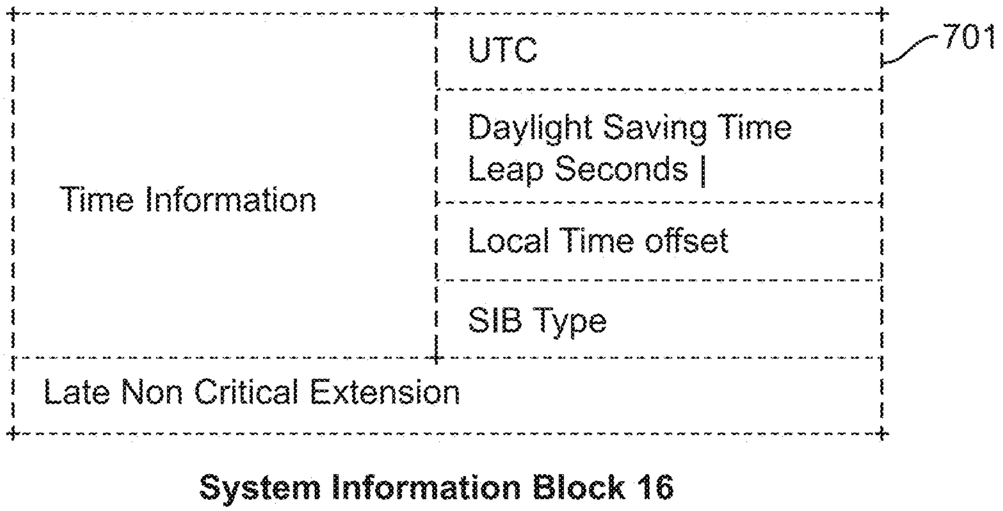
FIG. 7 is a system information block 16 (SIB16) that is leveraged by the tag to obtain time information, according to an example embodiment.

FIG. 7 is a system information block 16 (SIB16) that is leveraged by tag 300 to obtain time information, according to an example embodiment. The frequency of transmission of SIB16 is specified in the Scheduling Info List 404 in SIB1 (see FIG. 4). SIB16 carries the Co-ordinated Universal Time (UTC) 701, which, as will be explained further below, functions as a reference to record events. In one possible implementation, tag 300 may only need to extract UTC 701 once, and thereafter keep a local clock updated onboard. If implemented in this way, periodic synchronization checks can also be performed.

Operation

Tag 300 is configured to record location data from SIB1, along with direct or indirect SIB 16 timestamping, in connection with high level events in what can be considered a "trail of evidence" of device 110 being transported, in an unpowered state, from a starting point to a destination, where device 110 might then be installed and powered on.

Figure 8:
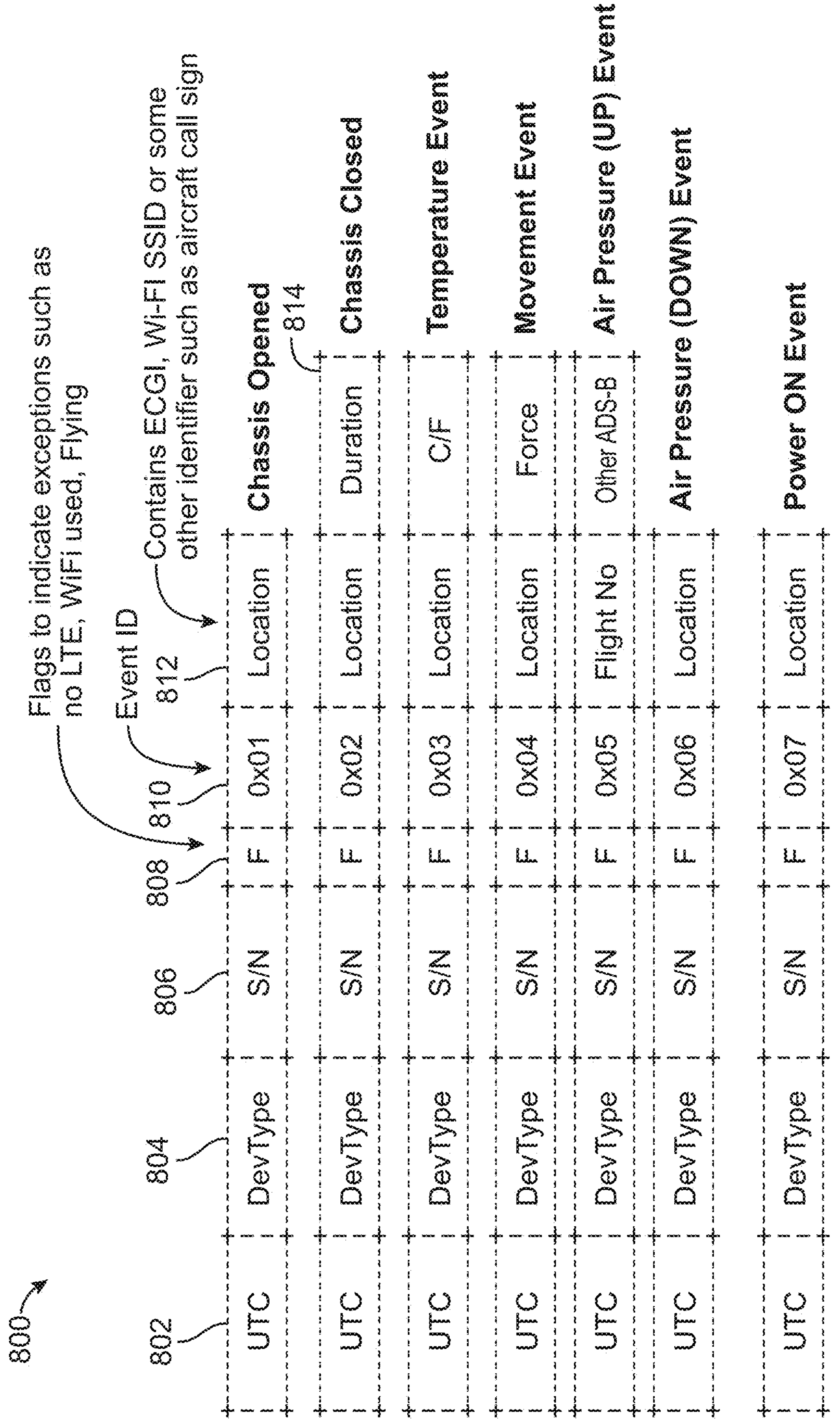
FIG. 8 is an example record of events recorded, over time, by the tag, according to an example embodiment.

FIG. 8 is an example record of events 800 recorded by tag 300, according to an example embodiment. As noted, tag 300 is equipped with several sensors as illustrated in FIG. 3, including accelerometer 350, temperature sensor 352, air pressure sensor 354, and tamper switch 356. In order to preserve battery life and reduce the amount of duplicate information, in operation, when one of these sensors detects a change, event/trigger logic 310 is configured to wake and record the LTE ECGI or, in the event of no LTE, any other relevant RF data (e.g., Wi-Fi SSID) that may be received via RF receiver 306. That is, as shown in FIG. 8, a record of events 800 is generated over time as events are detected and recorded one by one. The record of events 800 may include a timestamp 802 (e.g., UTC), a device type field 804 (e.g., router, switch, etc.), a serial number (S/N) field 806, a flag field 808, an event ID field 810, a location field 812, and a miscellaneous field 814 for providing still other relevant information, as desired. The flag field 808 may be used to indicate, e.g., whether LTE, Wi-Fi, or ADS-B RF broadcasts are being relied upon. The following are examples of events that the several sensors may detect, and the information that might then be recorded as a result of tag 300 being awakened, as shown in FIG. 8.

Chassis of device 110 is opened. Tamper switch 356 may activate tag 300 and event/trigger logic 310 may cause recordation of time, event, and, e.g., SIB1 location information.

Chassis of device 110 is closed. Tamper switch 356 may again activate tag 300 and event/trigger logic 310 and cause recordation of time, event, and, e.g., SIB1 location information, and perhaps duration of open state.

Module/card inserted/removed in/from device 110. On a large chassis, a module/card (perhaps having its own separate, dedicated, tag 300) could indicate when it was inserted or removed from device 110.

Temperature change. A variation of more than x degrees, detected by temperature sensor 352, could initiate an event entry in record of events 800.

Movement may be detected by accelerometer 350, and event/trigger logic 310 may then be configured to record a first movement, then, e.g., at every x period until movement stops for one period (e.g., if air pressure is above a certain threshold, recording of movement events may be halted).

Air pressure (UP) may be detected by air pressure sensor 354. For example, when air pressure signals at or above 8000 feet or 75 kPa, event/trigger logic 310 may be configured to record an event. For instance, ADS-B information can be used to identify an aircraft if LTE is not available. Additional discussion of ADS-B information is provided further below.

Air Pressure (DOWN) may likewise be detected by air pressure sensor 354. For example, when air pressure returns (goes down) to a value indicative of, e.g., 200 feet AFTER an Air pressure (UP) event, event/trigger logic 310 may be configured to record an event with LTE SIB1 (or ADS-B information).

For each event, as shown in FIG. 8, the device type ID, which describes the chassis model, module type, etc., is recorded along with the serial number of device 110 fitted with tag 300. Through this mechanism, it is possible to determine if device 110 was exported and/or re-exported to or through particular countries, whether it was potentially tampered with en route to a destination, or if it is operating in an export banned country.

Those skilled in the art will appreciate that what is described herein is a relatively simple embodiment, but embodiments could be more sophisticated by augmenting the number of (SIB1/SIB16) recorded events using additional sensor types (i.e., position, contact, force/load, etc.), and also using different identifiers other than SIBs, such as SSID, LoRaWAN network ID, etc.

Once device 110 is powered on, has connected to geo-tracking server 280, and authenticated (as desired), tag 300 may be configured to disengage, and subsequent monitoring may continue only upon powering down device 110, movement of device 110, and/or a chassis opening event.

As mentioned, tag 300 may be associated, affixed, or integrated with device 110 and/or with individual components of device 110, such as a line card. As such, one tag 300 may be designated as a "primary" tag 300, while another tag 300 may be designated as a "secondary" tag 300. Each secondary tag 300 may communicate with "primary" tag 300 via, e.g., a Bluetooth Low Energy (BLE) link, and may be asked to send "primary" tag 300 any information that any "secondary" tag 300 may have independently collected/recorded.

Power ON Event

Upon device 110 powering on, ("primary") tag 300 may be configured, as shown in FIG. 8, to add one last record in the record of events 800 that identifies the current location. "Primary" tag 300 may also query any "secondary" tag 300 for its list of recorded events.

Once device 110 (e.g., a router) has been configured via connection to a licensing server (which could also be geo-tracking server 280), all the stored events (i.e., the record of events 800) may be first transferred from ("primary") tag 300 to device 110, and then device 110 may be configured to transmit that information or aspects thereof to geo-tracking server 280. Geo-tracking server 280 may then perform post-processing to search for anomalies in activity related to opening device 110, a transportation path taken, delivery/transit duration, etc. In the event no Internet access is available, and thus device 110 does not connect with geo-tracking server 280, the following process may be undertaken. After a predetermined number of days, if there is still no Internet access, the "primary" tag 300 may consult an onboard list of embargoed countries stored, e.g., in MCC format. If any of the collected events contains one of the stored embargoed MCCs, a warning message may be written to the system log of device 110 to contact the manufacturer for remediation. In one possible implementation, a total of three warnings may be issued over some predetermined number of days, after which time, if no remediation has been applied, device 110 may be configured to deactivate. Either device 110 will power off, or it will not operate in the power on state.

Figure 9:
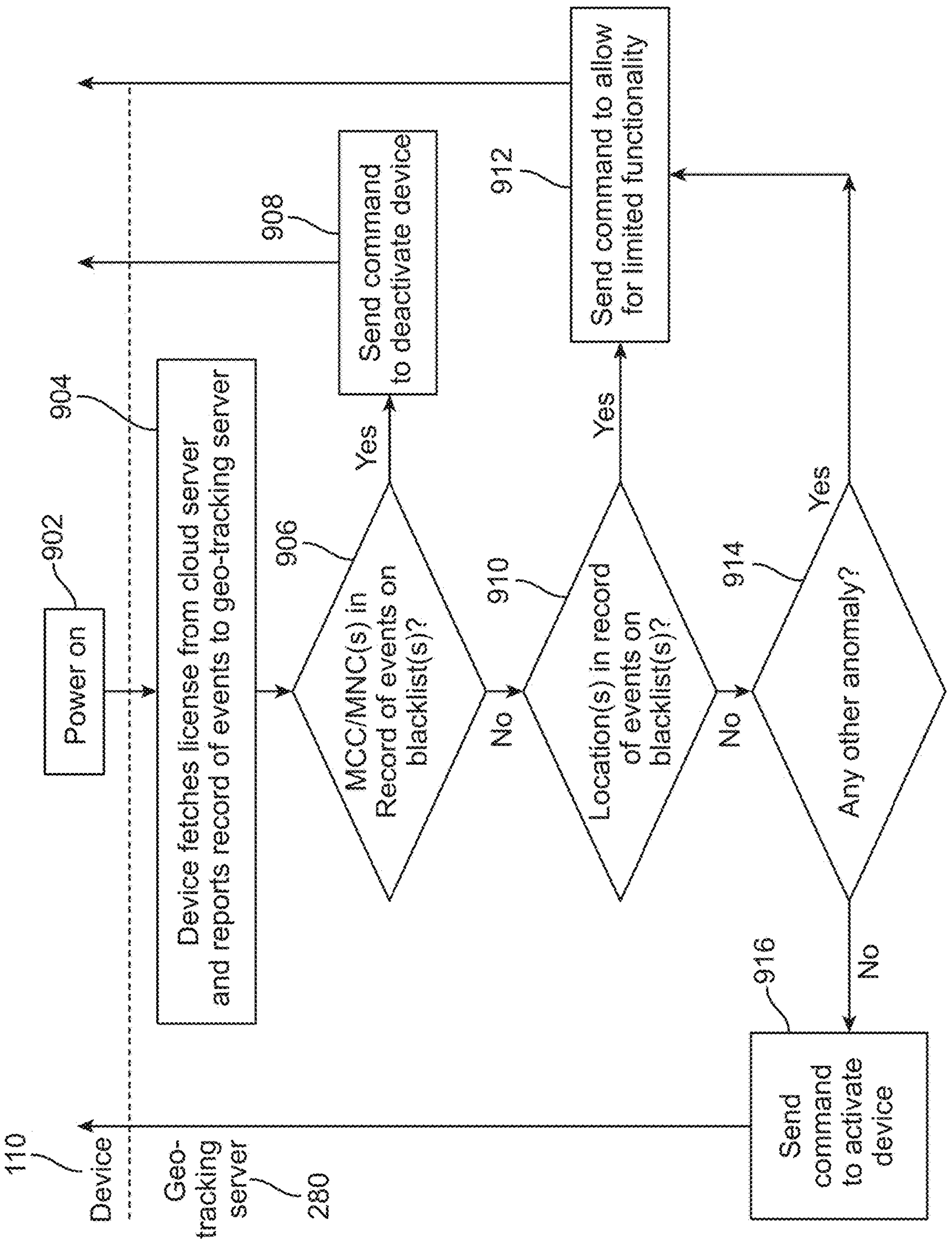
FIG. 9 is a flow chart of operations executed, primarily, by the geo-tracking server, according to an example embodiment.

FIG. 9 is a flow chart of operations of device 110 connecting with the geo-tracking server 280, according to an example embodiment. At 902, device 110 experiences a power on event. At 904, device 110 may then fetch a license from a cloud server via a network such as the Internet, and may also report its record of events to geo-tracking server 280 that has been previously developed and stored in, e.g., tag 300, and then passed to device 110 upon powering up. Geo-tracking server 280 is thus in possession of the record of events 800 on which it can then conduct post-processing. For example, at 906, geo-tracking server 280 may determine if any of the MCC/MNCs stored in the record of events 800 is on a blacklist. If yes, then at 908, geo-tracking server 280 may send a command to device 110 to deactivate device 110. If none of the MCC/MNCs appears on a blacklist, then at 910, geo-tracking server 280 may determine if any of the locations recorded in the record of events is on a blacklist. If yes, then at 912, geo-tracking server 280 may send a command to device 110 to allow device 110 to operate with limited functionality, such as only being able to communicate further with geo-tracking server 280 (or licensing server) without allowing device 110 to perform, e.g., full routing services.

If, at 910, none of the locations recorded in the record of events 800 was on the blacklist, then at 914, geo-tracking server 280 determines if any other anomaly has occurred based on the information received in the record of events 800. If yes, the process returns to 912 where geo-tracking server 280 sends a command to device 110 to operate with limited functionality. If, at 914, there were no other detected anomalies based on the information in the record of events 800, then at 916, geo-tracking server 280 sends a command to fully activate device 110.

Geo-tracking server 280 may also be configured to categorize the confidence level for device 110 depending on the events that have taken place during transit of device 110. The following table summarizes example confidence categorizations and suggested functional responses.

| High Confidence | Low Confidence | No Confidence |
|---|---|---|
| No embargoed countries were detected<br>Product was not opened<br>no rough handling<br>No anomalous delivery paths ascertained | No embargoed countries were detected<br>AND<br>Device has been tampered with (modules removed/inserted or chassis opened)<br>OR<br>Tag detected rough handling or some other anomalous activity (delivery path longer or deviated from expectations) | At some point, passed through an embargoed country or a location on a watch list.<br>Highly suspicious |

-continued

| High Confidence | Low Confidence | No Confidence |
|---|---|---|
| All the subscribed features/functionalities for the device are activated. | Basic functionalities are activated and the device is expected to report the location on a timely basis until the anomalies are resolved/remediated | No functionality is activated; Device behaves as if in power OFF state until anomaly can be resolved/ remediated |

As mentioned, tag 300 may be configured to receive and extract any Wi-Fi SSIDs and associated MAC address it may see during transit. Deducing a location from a Wi-Fi SSID+MAC is well-known to those having ordinary skill in the art. Relying on Wi-Fi SSIDs may be useful in the event no LTE is available. Further, by including an SSID capability, geo-tracking server 280 could be configured to request, on-demand, from tag 300 any SSIDs within range, rather than tag 300 having to scan for Wi-Fi SSIDs. In other words, once device 110 is installed and powered on, if geo-tracking server 280 detected a possible anomaly during prior transit it could then request a more granular location (if possible) by scanning for SSID or any other RF technologies that may be available.

Tag 300 may include or be associated with an appropriate flat antenna that is deployed on the outside of a chassis of device 110. Such an antenna may comprise a PCB or stick-on style antenna disposed to an external surface of device 110 (or appropriate spot) and covered by a (plastic) plate that allows signals to reach the antenna. Depending on the RF signals that are being monitored, it may be useful to have several antennas for different frequency bands, for example, LTE and ADS-B.

Automatic Dependent Surveillance-Broadcast (ADS-B)

In cases when RF signal monitoring is taking place on an aircraft, the data in the aircraft ADS-B beacon can be used instead of LTE SIB for geo-tracking. Currently, all commercial aircraft broadcast an ADS-B beacon containing parameters such as position, velocity, unique transponder identification (like a 24-bit Ethernet address) and call sign over 1090 MHz.

If device 110 and corresponding tag 300 are placed in the cargo hold of an aircraft, the ADS-B received signal strength (RSSI) of that aircraft may be sufficiently strong enough to be received by tag 300. The information ADS-B is capable of sharing may include aircraft identification, surface position, airborne position (with barometric altitude), airborne velocities, airborne position, aircraft status, target state and status information, and aircraft operation status. Of particular interest for the approach described herein are the surface position and airborne position that would provide location data for the record of events 800. Both of these position messages contain encoded latitude and longitude fields that, through processing, can provide globally or locally unambiguous position decoding.

Figure 10:
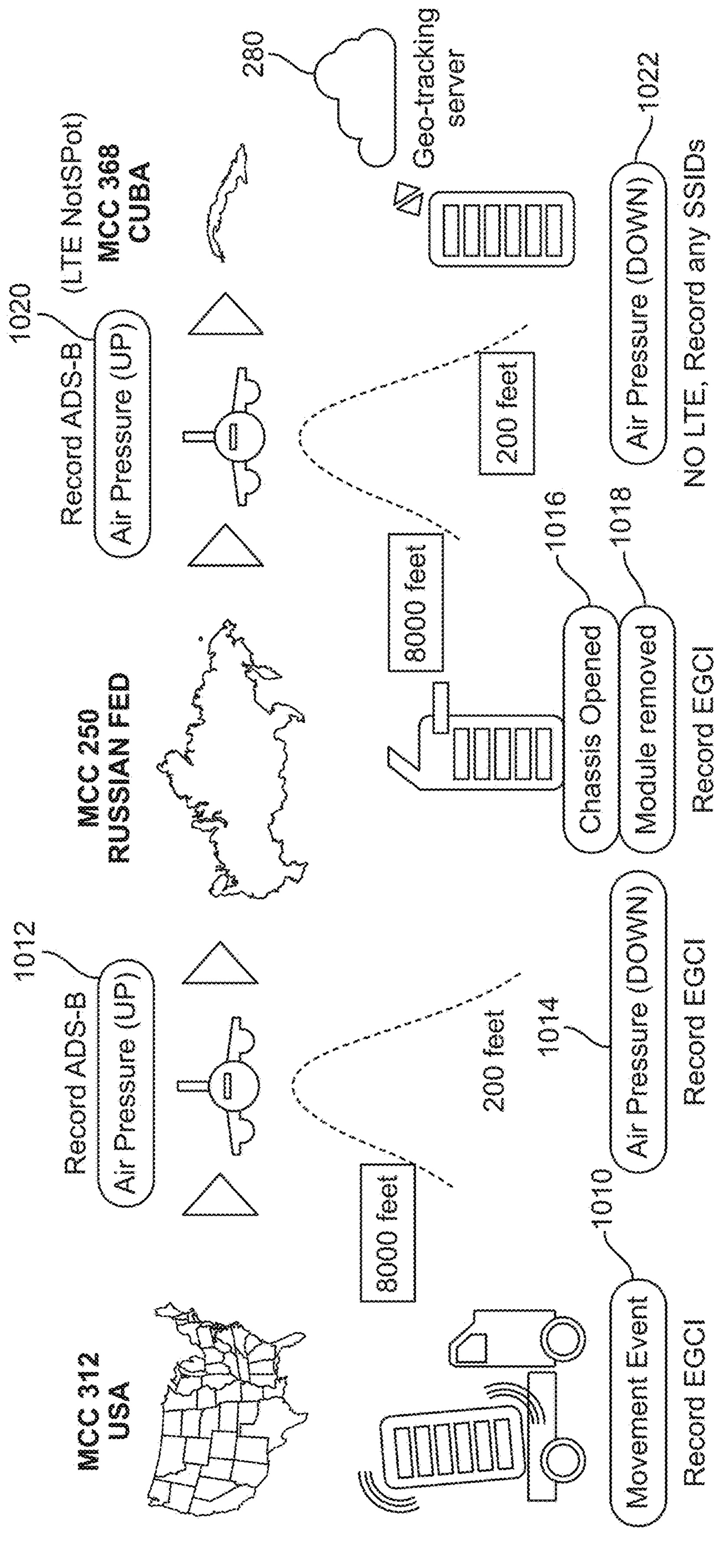
FIG. 10 illustrates events that can trigger the tag to record radio frequency transmissions available at the time of the event, according to an example embodiment.

FIG. 10 illustrates a series of events that can trigger tag 300 to record location data obtainable from radio frequency transmissions available at the time of the event, according to an example embodiment. At 1010, movement is detected by tag 300 while device 110 is on a truck, and location (MCC 312 for USA) and time are recorded. Device 110 is then loaded onto an aircraft where the air pressure sensors detect a substantial change 1012. In the aircraft, tag 300 can record contextual information (location, aircraft call sign) extracted from the aircraft's ADS-B beacon. Once the chassis lands (1014), an event may be logged to record the location/country, time, etc., based on RF information (e.g., MCC 250 for Russian Federation). The chassis may be opened at 1016 along with module removal/insertion events 1018, and these events may be recorded. Then, device 110 may be again loaded on an aircraft represented by air pressure events 1020, 1022, with a final destination of an embargoed country (e.g., MCC 368 for Cuba). However, in this case, the country, Cuba, does not have LTE, but tag 300 can nevertheless determine location via extracted ADS-B messages. There may also be an opportunity to probe for Wi-Fi SSID information that can be processed later through a Wi-Fi geo-location service. At the POWER ON event, all these events are sent to geo-tracking server 280, which analyzes the events to identify anomalies which could include substantial deviation in the delivery path (whether it be local or international), excessive temperature fluctuations, rough handling, tampering, and passing through middleman countries, among other possibilities.

Figure 11:
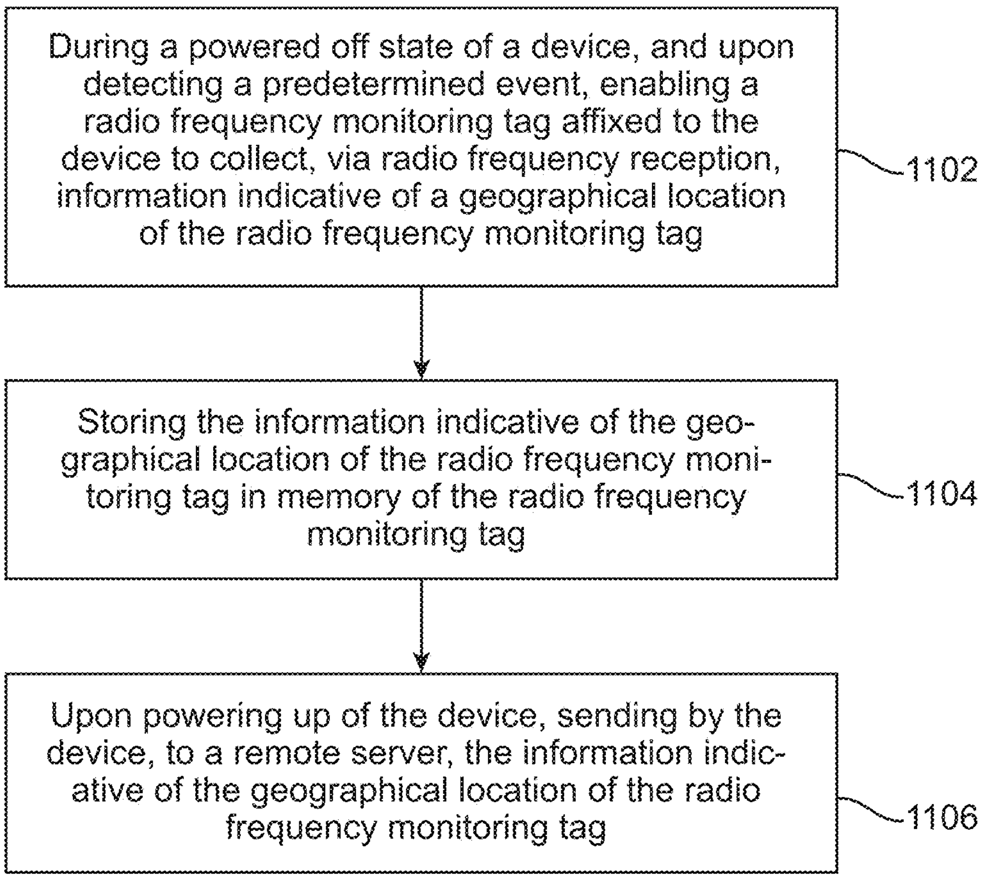
FIG. 11 shows a series of operations that may be executed by event/trigger logic, according to an example embodiment.

FIG. 11 shows a series of operations that may be executed by device 110 and/or event/trigger logic 310, according to an example embodiment. At 1102, during a powered off state of the device, and upon detecting a predetermined event, an operation process is configured to enable a radio frequency monitoring tag affixed to the device to collect, via radio frequency reception, information indicative of a geographical location of the radio frequency monitoring tag. At 1104, an operation is configured to store the information indicative of the geographical location of the radio frequency monitoring tag in memory of the radio frequency monitoring tag. And, at 1106, an operation is configured to, upon powering up of the device, send by the device, to a remote server, the information indicative of the geographical locations detected by the radio frequency monitoring tag. The remote server can then analyze the information indicative of the geographical locations detected by the radio frequency monitoring tag to determine if the tag and the device experienced anomalies while in transit.

Figure 12:
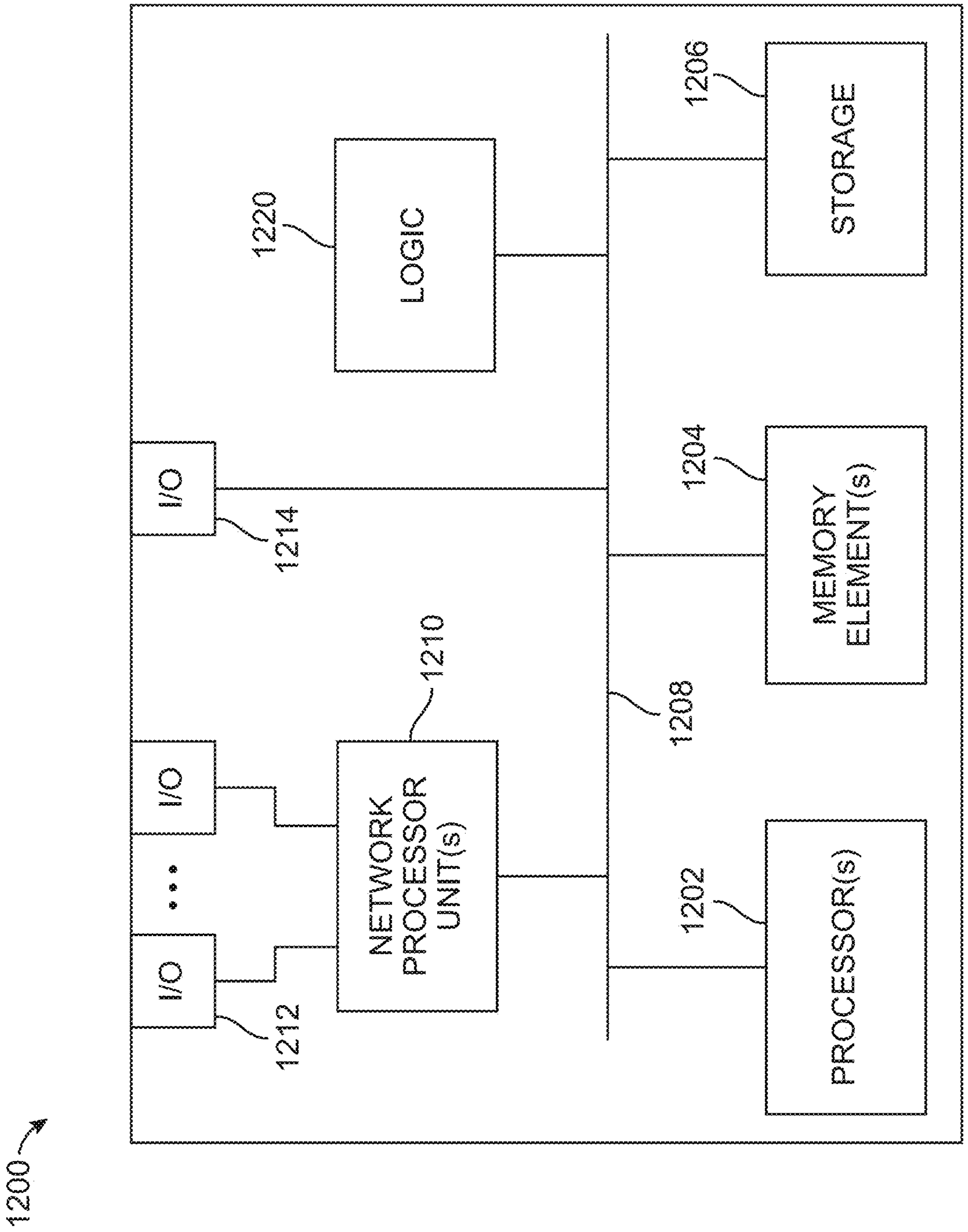
FIG. 12 is a block diagram of the or the geo-location server that may be configured to host, respectively, event/trigger logic 310 and logic to perform subsequent analysis of information obtained by the tag, and perform the techniques described herein, according to an example embodiment.

FIG. 12 is a block diagram of a device that may be configured to host, respectively, event/trigger logic 310 and logic to perform subsequent analysis of information obtained by tag 300, or to operate as device 110, and perform the techniques described herein, according to an example embodiment.

In various embodiments, a computing device, such as computing device 1200 or any combination of computing devices 1200, may be configured as any entity/entities as discussed for the techniques depicted in connection with FIGS. 1-11 in order to perform operations of the various techniques discussed herein.

In at least one embodiment, the computing device 1200 may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220 (which could include, for example, event/trigger logic 310). In various embodiments, instructions associated with logic for computing device 1200 can overlap in any manner and are not limited to the specific allocation of instructions and/or operations described herein.

In at least one embodiment, processor(s) 1202 is/are at least one hardware processor configured to execute various tasks, operations and/or functions for computing device 1200 as described herein according to software and/or instructions configured for computing device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with memory element(s) 1204 (or vice versa) or can overlap/exist in any other suitable manner.

In at least one embodiment, bus 1208 can be configured as an interface that enables one or more elements of computing device 1200 to communicate in order to exchange information and/or data. Bus 1208 can be implemented with any architecture designed for passing control, data and/or information between processors, memory elements/storage, peripheral devices, and/or any other hardware and/or software components that may be configured for computing device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 (wired and/or wireless) to facilitate operations discussed for various embodiments described herein. In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1212 can be configured as one or more Ethernet port(s), Fibre Channel ports, any other I/O port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information with other entities that may be connected to computing device 1200. For example, I/O interface(s) 1214 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable.

For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further, as referred to herein, 'at least one of' and 'one or more of' can be represented using the '(s)' nomenclature (e.g., one or more element(s)).

In sum, in one embodiment a method is provided. The method may include during a powered off state of a device, and upon detecting a predetermined event, enabling a radio frequency monitoring tag affixed to the device to collect, via radio frequency reception, information indicative of a geographical location of the radio frequency monitoring tag, storing the information indicative of the geographical location of the radio frequency monitoring tag in memory of the radio frequency monitoring tag, and upon powering up of the device, sending by the device, to a remote server, the information indicative of the geographical location of the radio frequency monitoring tag.

The method may further include, upon powering up of the device, transferring the information indicative of the geographical location of the radio frequency monitoring tag from the memory of the radio frequency monitoring tag to memory of the device.

The method may also include powering the radio frequency monitoring tag with a battery.

In the method, the predetermined event may include at least one of opening or closing a chassis of the device, inserting into or removing a component from the device, detecting a change in temperature, detecting a change in movement, detecting a change in air pressure, or detecting that the device has been powered on.

In the method, the information indicative of a geographical location of the radio frequency monitoring tag may be received as a cellular long-term evolution (LTE) System Information Block 1 (SIB1) broadcast.

In the method, the information indicative of a geographical location of the radio frequency monitoring tag may be received as a cellular long-term evolution (LTE) System Information Block 16 (SIB16) broadcast.

In the method, the information indicative of a geographical location of the radio frequency monitoring tag may be received as an Automatic Dependent Surveillance-Broadcast (ADS-B) beacon broadcast.

In the method, the information indicative of a geographical location of the radio frequency monitoring tag may be received as a wireless local area network Service Set Identifier (SSID).

In the method, the information indicative of a geographical location of the radio frequency monitoring tag may include a Mobile Country Code (MCC) and a Mobile Network Code (MNC).

In the method, the remote server is associated with a licensing server for the device, and the method may further include receiving, by the device, licensing configuration information that enables the device to operate over a network.

A device may also be provided. The device may include an interface configured to enable network communications, a memory, and one or more processors coupled to the interface and the memory, and configured to: during a powered off state of the device, and upon detecting a predetermined event, enable a radio frequency monitoring tag affixed to the device to collect, via radio frequency reception, information indicative of a geographical location of the radio frequency monitoring tag, store the information indicative of the geographical location of the radio frequency monitoring tag in memory of the radio frequency monitoring tag, and upon powering up of the device, send, by the device, to a remote server, the information indicative of the geographical location of the radio frequency monitoring tag.

In the device, the one or more processors may be further configured to, upon powering up of the device, transfer the information indicative of the geographical location of the radio frequency monitoring tag from the memory of the radio frequency monitoring tag to the memory of the device.

In the device, the radio frequency monitoring tag may be powered by a battery.

In the device, the predetermined event may include at least one of opening or closing a chassis of the device, inserting into or removing a component from the device, detecting a change in temperature, detecting a change in movement, detecting a change in air pressure, or detecting that the device has been powered on.

In the device, the information indicative of a geographical location of the radio frequency monitoring tag may be received as a cellular long-term evolution (LTE) System Information Block 1 (SIB1) broadcast.

In the device, the information indicative of a geographical location of the radio frequency monitoring tag may be received as a cellular long-term evolution (LTE) System Information Block 16 (SIB16) broadcast.

In the device, the information indicative of a geographical location of the radio frequency monitoring tag may be received as an Automatic Dependent Surveillance-Broadcast (ADS-B) beacon broadcast.

In still another embodiment, there is provided one or more non-transitory computer readable storage media encoded with instructions that, when executed by a processor, cause the processor to: during a powered off state of a device, and upon detecting a predetermined event, enable a radio frequency monitoring tag affixed to a device to collect, via radio frequency reception, information indicative of a geographical location of the radio frequency monitoring tag, store the information indicative of the geographical location of the radio frequency monitoring tag in memory of the radio frequency monitoring tag, and upon powering up of the device, send by the device, to a remote server, the information indicative of the geographical location of the radio frequency monitoring tag.

The predetermined event may include at least one of opening or closing a chassis of the device, inserting into or removing a component from the device, detecting a change in temperature, detecting a change in movement, detecting a change in air pressure, or detecting that the device has been powered on.

The information indicative of a geographical location of the radio frequency monitoring tag may be received as a cellular long-term evolution (LTE) System Information Block 1 (SIB1) broadcast.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

during a powered off state of a device, and upon detecting predetermined events including a change of movement using an accelerometer of a radio frequency monitoring tag affixed to the device, enabling the radio frequency monitoring tag to collect, via radio frequency reception, information indicative of geographical locations corresponding respectively to the predetermined events;

storing the information indicative of the geographical locations in memory of the radio frequency monitoring tag;

upon powering up of the device and upon the device connecting with a remote server to activate the device, sending by the device, to the remote server, the information indicative of the geographical locations; and receiving a command from the remote server to deactivate the device in response to determining that a given geographical location indicated by the information indicative of the geographical locations corresponds to a location in which the device is unauthorized to be located.

2. The method of claim 1, further comprising, upon powering up of the device, transferring the information indicative of the geographical locations from the memory of the radio frequency monitoring tag to a memory of the device.

3. The method of claim 1, further comprising powering the radio frequency monitoring tag with a battery.

4. The method of claim 1, wherein the predetermined events include at least one of opening or closing a chassis of the device, inserting into or removing a component from the device, detecting a change in temperature, detecting a change in air pressure, or detecting that the device has been powered on.

5. The method of claim 1, wherein the information indicative of the geographical locations is received as a cellular long-term evolution (LTE) System Information Block 1 (SIB1) broadcast.

6. The method of claim 1, wherein the information indicative of the geographical locations is received as a cellular long-term evolution (LTE) System Information Block 16 (SIB16) broadcast.

7. The method of claim 1, wherein the information indicative of the geographical locations is received as an Automatic Dependent Surveillance-Broadcast (ADS-B) beacon broadcast.

8. The method of claim 1, wherein the information indicative of the geographical locations is received as a wireless local area network Service Set Identifier (SSID).

9. The method of claim 1, wherein the information indicative of the geographical locations comprises a Mobile Country Code (MCC) and a Mobile Network Code (MNC).

10. The method of claim 1, wherein the remote server is associated with a licensing server for the device, and the method further comprises, receiving, by the device, licensing configuration information that enables the device to operate over a network.

11. A device comprising:

an interface configured to enable network communications;

a memory; and one or more processors coupled to the interface and the memory, and configured to:

during a powered off state of the device, and upon detecting predetermined events including a change of movement using an accelerometer of a radio frequency monitoring tag affixed to the device, enable the radio frequency monitoring tag to collect, via radio frequency reception, information indicative of geographical locations corresponding respectively to the predetermined events;

store the information indicative of the geographical locations in a memory of the radio frequency monitoring tag;

upon powering up of the device and upon the device connecting with a remote server to activate the device, send by the device, to the remote server, the information indicative of the geographical locations; and receive a command from the remote server to deactivate the device in response to determining that a given geographical location indicated by the information indicative of the geographical locations corresponds to a location in which the device is unauthorized to be located.

12. The device of claim 11, wherein the one or more processors are further configured to, upon powering up of the device, transfer the information indicative of the geographical locations from the memory of the radio frequency monitoring tag to memory of the device.

13. The device of claim 11, wherein the radio frequency monitoring tag is powered by a battery.

14. The device of claim 11, wherein the predetermined events include at least one of opening or closing a chassis of the device, inserting into or removing a component from the device, detecting a change in temperature, detecting a change in air pressure, or detecting that the device has been powered on.

15. The device of claim 11, wherein the information indicative of the geographical locations is received as a cellular long-term evolution (LTE) System Information Block 1 (SIB1) broadcast.

16. The device of claim 11, wherein the information indicative of the geographical locations is received as a cellular long-term evolution (LTE) System Information Block 16 (SIB16) broadcast.

17. The device of claim 11, wherein the information indicative of the geographical locations is received as an Automatic Dependent Surveillance-Broadcast (ADS-B) beacon broadcast.

18. One or more non-transitory computer readable storage media encoded with instructions that, when executed by a processor, cause the processor to:

during a powered off state of a device, and upon detecting predetermined events including a change of movement using an accelerometer of a radio frequency monitoring tag affixed to a device, enable the radio frequency monitoring tag to collect, via radio frequency reception, information indicative of geographical locations corresponding respectively to the predetermined events;

store the information indicative of the geographical locations in memory of the radio frequency monitoring tag;

upon powering up of the device and upon the device connecting with a remote server to activate the device, send by the device, to the remote server, the information indicative of the geographical locations; and receive a command from the remote server to deactivate the device in response to determining that a given geographical location indicated by the information indicative of the geographical locations corresponds to a location in which the device is unauthorized to be located.

19. The one or more non-transitory computer readable storage media of claim 18, wherein the predetermined events include at least one of opening or closing a chassis of the device, inserting into or removing a component from the device, detecting a change in temperature, detecting a change in air pressure, or detecting that the device has been powered on.

20. The one or more non-transitory computer readable storage media of claim 18, wherein the information indicative of the geographical locations is received as a cellular long-term evolution (LTE) System Information Block 1 (SIB1) broadcast.

* * * * *